United States Patent
Yao et al.

(10) Patent No.: US 12,372,504 B2
(45) Date of Patent: Jul. 29, 2025

(54) METHOD FOR DETECTING TCEP CONTENT IN ADC BY LC-MS/MS

(71) Applicant: REMEGEN CO., LTD., Yantai (CN)

(72) Inventors: Xuejing Yao, Yantai (CN); Li Wang, Yantai (CN); Wenlong Sun, Yantai (CN); Guiping Qi, Yantai (CN)

(73) Assignee: REMEGEN CO., LTD., Yantai (CN)

( * ) Notice: Subject to any disclaimer, the term of this patent is extended or adjusted under 35 U.S.C. 154(b) by 165 days.

(21) Appl. No.: 17/794,629

(22) PCT Filed: Mar. 30, 2022

(86) PCT No.: PCT/CN2022/083946
§ 371 (c)(1),
(2) Date: Jul. 22, 2022

(87) PCT Pub. No.: WO2022/206807
PCT Pub. Date: Oct. 6, 2022

(65) Prior Publication Data
US 2024/0201147 A1    Jun. 20, 2024

(30) Foreign Application Priority Data

Mar. 31, 2021   (CN) .......................... 202110348153.5

(51) Int. Cl.
*B01L 3/00*    (2006.01)
*B01D 15/08*   (2006.01)
(Continued)

(52) U.S. Cl.
CPC ......... *G01N 30/7233* (2013.01); *B01D 15/08* (2013.01); *G01N 2030/027* (2013.01)

(58) Field of Classification Search
CPC ......... G01N 30/7233; G01N 2030/027; G01N 2030/884; G01N 30/88; B01D 15/08
See application file for complete search history.

(56) References Cited

U.S. PATENT DOCUMENTS

2010/0248380 A1    9/2010  Gless, Jr. et al.

FOREIGN PATENT DOCUMENTS

| CN | 101776663 A | 7/2010 |
| CN | 102288690 A | 12/2011 |

(Continued)

OTHER PUBLICATIONS

Hao, Chunyan, et al. "Liquid chromatography-tandem mass spectrometry direct injection analysis of organophosphorus flame retardants in Ontario surface water and wastewater effluent." Chemosphere 191 (2018): 288-295. (Year: 2018).*

(Continued)

*Primary Examiner* — Jennifer Wecker
*Assistant Examiner* — Oyeleye Alexander Alabi
(74) *Attorney, Agent, or Firm* — Kilpatrick Townsend & Stockton LLP

(57) ABSTRACT

The present disclosure relates to a method for detecting TCEP content in ADC by LC-MS/MS. The ADC samples are derivatized by Ellman reaction, and then the TCEP content is measured by LC-MS/MS. This method can exclude the interference caused by the substances that may react with Ellman in complex ADC samples, which provides with no need for sample pretreatment, and with strong specificity.

12 Claims, 2 Drawing Sheets

(51) Int. Cl.

| | | |
|---|---|---|
| *B01F 33/302* | (2022.01) | |
| *B01F 33/3033* | (2022.01) | |
| *B01L 7/00* | (2006.01) | |
| *B01L 9/00* | (2006.01) | |
| *B65G 47/80* | (2006.01) | |
| *B82Y 20/00* | (2011.01) | |
| *B82Y 30/00* | (2011.01) | |
| *B82Y 40/00* | (2011.01) | |
| *C12M 1/34* | (2006.01) | |
| *C12M 3/06* | (2006.01) | |
| *C12N 1/14* | (2006.01) | |
| *C12N 1/20* | (2006.01) | |
| *C12Q 1/02* | (2006.01) | |
| *C12Q 1/6806* | (2018.01) | |
| *C12Q 1/6844* | (2018.01) | |
| *C12Q 1/6848* | (2018.01) | |
| *C12Q 1/686* | (2018.01) | |
| *G01N 15/10* | (2024.01) | |
| *G01N 15/14* | (2024.01) | |
| *G01N 15/1433* | (2024.01) | |
| *G01N 21/29* | (2006.01) | |
| *G01N 21/65* | (2006.01) | |
| *G01N 30/02* | (2006.01) | |
| *G01N 30/72* | (2006.01) | |
| *G01N 33/543* | (2006.01) | |
| *G01N 33/557* | (2006.01) | |
| *G01N 33/574* | (2006.01) | |
| *G01N 33/58* | (2006.01) | |

(56) References Cited

FOREIGN PATENT DOCUMENTS

| CN | 102662020 A | | 9/2012 |
|---|---|---|---|
| CN | 102944635 A | | 2/2013 |
| CN | 109374769 A | * | 2/2019 |
| CN | 111044643 A | | 4/2020 |

OTHER PUBLICATIONS

European Patent Office, European Search Report in Application No. 22778989.8, Feb. 14, 2025, 6 pages.

Cumnock K. et al., "Trisulfide Modification Impacts the Reduction Step in Antibody-Drug Conjugation Process", Bioconjugate Chemistry, vol. 24, No. 7, Jul. 17, 2013 (Jul. 17, 2013), pp. 1154-1160.

Bellini E. et al., "Characterization and quantification of thiol-peptides in *Arabidopsis thaliana* using combined dilution and high sensitivity HPLC-ESI-MS-MS", Phytochemistry, vol. 164, Jun. 6, 2019 (Jun. 6, 2019), pp. 215-222.

Lantz R et al., "Effects of disulfide bond and cholesterol derivatives on human calcitonin amyloid formation", Wiley Biopolymers, vol. 111, No. 5, Dec. 5, 2019 (Dec. 5, 2019), pp. 1-9.

Perrino E. et al., "Curative Properties of Noninternalizing Antibody-Drug Conjugates Based on Maytansinoids", Cancer Research, vol. 74, No. 9, Feb. 11, 2014 (Feb. 11, 2014), pp. 2569-2578.

Joan Christine Han et al.,"A Procedure for Quantitative Determination of Tris(2-carboxyethyl)phosphine, an Odorless Reducing Agent More Stable and Effective Than Dithiothreitol", Academic Press Inc., Analytical Biochemistry 220, Jun. 21, 1993, total 6 pages.

* cited by examiner

METHOD FOR DETECTING TCEP CONTENT IN ADC BY LC-MS/MS

CROSS-REFERENCE OF RELATED APPLICATIONS

The present application is the national phase of International Application No. PCT/CN2022/083946, titled "METHOD FOR DETECTING TCEP CONTENT IN ADC BY LC-MS/MS", filed on Mar. 30, 2022, which claims priority to Chinese Patent Application No. CN202110348153.5, titled "METHOD FOR DETECTING TCEP CONTENT IN ADC BY LC-MS/MS", filed on Mar. 31, 2021 with the China National Intellectual Property Administration, which are incorporated herein by reference in their entireties.

FIELD

The present disclosure relates to the field of biomedicine, and in particular to a method for detecting TCEP content in antibody drug conjugate (ADC) samples by liquid chromatography-tandem mass spectrometry (LC-MS/MS, or LC-MSMS).

BACKGROUND

TCEP, also known as tris(2-carboxyethyl)phosphine, is a very effective thiol reducing agent, widely used as a quantitative reducing agent for disulfide bonds in protein chemistry and proteomics research. The stability and solubility of this reagent in aqueous solution are both very good, and the stability of it in acidic and alkaline solutions is also good, so TCEP is often preferred in protein chemistry and proteomics research.

Compared to the other two common agents (dithiothreitol and β-mercaptoethanol) used to reduce proteins, TCEP is an odorless, more potent and irreversible reducing agent. The products of TCEP-mediated disulfide bonds cleavage are actually two free thiols/cysteines, which are more hydrophilic and more resistant to air oxidation. It also does not reduce the metals used in immobilized metal affinity chromatography.

TCEP is currently widely used in the production of ADC products, and the addition step is in the process of the monoclonal antibody reduction, and the main purpose is to protect the reduced protein. The process practice shows that without the addition of reducing agents, ADC cannot be conjugated normally or the quality of the product after conjugation decreases. However, TCEP is no longer required in the synthesis step after antibody reduction, and there is no specific removal process for TCEP in the subsequent processing in the prior art for synthesizing ADC, and it is only removed in the product dialysis process. Therefore, it has the possibility of residual in ADC products, which has a certain negative impact on the safety of subsequent finished medicines, and cannot be ignored. At present, no research on the detection of TCEP in ADC-related products has been found in the prior art.

LC-MS/MS is actually a comprehensive detection technology that combines LC technology with MS-MS technology. LC-MS/MS is a combination of liquid chromatography (LC) and mass spectrometry (MS). Its working principle is: after the sample is injected, it is first carried by the mobile phase into the chromatographic column, and after separation by the chromatographic column, it enters the mass spectrometer for analysis. detection. The mass spectrometer performs detection according to the mass-to-charge ratio (m/z) of the analytes. The analytes are converted into gas-phase ions in the ion source and enter the mass spectrometer. In the triple quadrupole, the primary mass spectrometer scans a specific range of ions or allows specific ions to enter the collision cell. In the collision cell, the molecular ions are fragmented by collision, and the product ions are formed and enter into the secondary mass spectrometer. The secondary mass spectrometer scans a specific range of ions or allows specific ions to enter the detector. Therefore, it can be seen that the advantages of LC-MS/MS are very significant, because gas chromatography can only separate volatile and non-decomposable substances, while liquid chromatography greatly broadens the separation range. It can be seen that the combination of LC and MS/MS with high selectivity and high sensitivity can perform real-time analysis on complex samples. Even in the case of difficult separation by LC, as long as the target compounds are scanned with neutral fragments by MS1 and MS2, the target compounds in the mixture can be found and highlighted, which can significantly improve the signal-to-noise ratio.

Tris(2-carboxyethyl)phosphine (TCEP) can quantitatively reduce aromatic disulfide compounds in a certain pH range, so the concentration of TCEP can be easily determined by measuring the amount of 5-mercapto-2-nitrobenzoic acid (TNB) formed after the reaction with Ellman (DTNB) (see Analytical Biochemistry, 1994, 220: 5~10). Therefore, Ellman reaction derivatization is mostly used in the currently reported TCEP detections. The reaction principle is as follows:

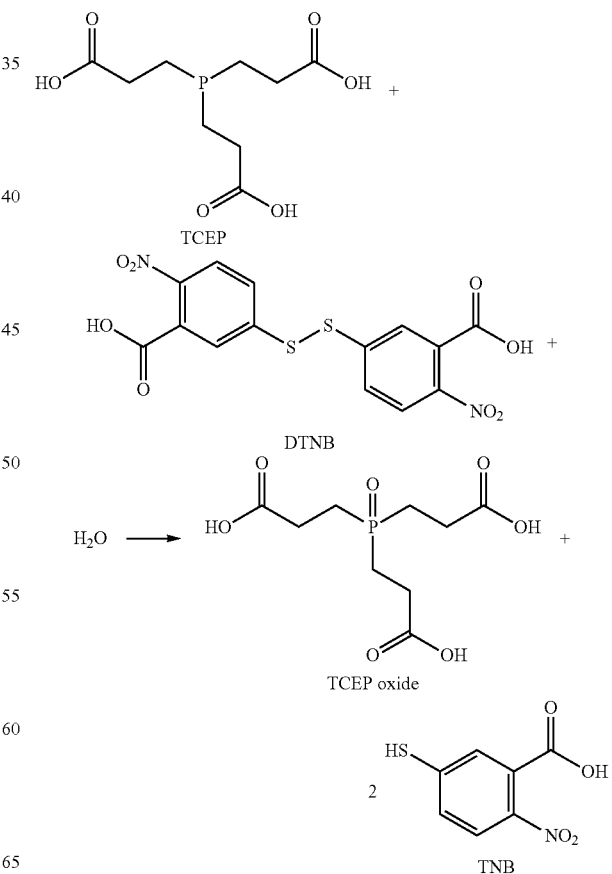

However, many reagents used in protein drugs and drugs can also react with DTNB to generate TNB. Therefore, the method of determining the concentration of TCEP in ADC by measuring the amount of TNB is easily affected by other reducing agents in the samples, and its accuracy is not high.

And at present, there are few detection methods for TCEP content. Due to the high polarity of TCEP, it has no retention on C18, and has a low response under UV detector and mass spectrometry. Therefore, there is no effective direct detection method. The inventors of the present application used LC-MSMS for the detection of TCEP in antibody drug conjugate products, and developed a detection method with high efficiency, stability and accuracy.

SUMMARY

The present patent uses LC-MS/MS method to detect TCEP in the antibody-drug conjugate product, and Ellman method is used for the derivatization of samples. Measuring the content of TCEP derivatization product, rather than measuring the content of TNB, can exclude the interference caused by the substances that may react with Ellman reagent (DTNB) in complex ADC samples, which provides with no need for sample pretreatment, and with strong specificity.

The first aspect of the present disclosure relates to a method for detecting TCEP content in ADC samples by liquid chromatography-tandem mass spectrometry (LC-MS/MS), and the detected ADC samples are derivatized by Ellman reaction, and a C18 chromatography column is used, without need for sample pretreatment.

Further, the mobile phase A used is an aqueous solution comprising formic acid; preferably an aqueous solution comprising 0.1% formic acid.

Further, the mobile phase B used is an acetonitrile/methanol solution comprising formic acid; preferably an acetonitrile/methanol (80/20, v/v) solution comprising 0.1% formic acid.

Further, the concentration of the added Ellman reagent is about 5-20 μg/ml, more preferably 10.0 μg/ml.

Further, the method uses TCEP to prepare standard solution.

According to any embodiment of the first aspect of the present disclosure, TCEP is used to prepare standard solution.

Further, the standard solution is preferably a 1.0 μg/ml TCEP solution.

Further, the preparation of the TCEP solution and the preparation of the series solutions for standard curve comprise the following steps:
1) Preparation of TCEP working solution: weighing 5~10 mg of TCEP·HCl reference substance into an EP tube and dissolving with an appropriate amount of sample dissolving solution, and the weighed mass is expressed as m, calculating the TCEP concentration by the molar ratio of TCEP·HCl and TCEP of 1:1, and performing dilution stepwise to a TCEP concentration of 1.0 μg/ml;
2) Preparation of series solutions for standard curve: diluting 1.0 μg/ml TCEP standard solution with diluent to the TCEP standard solutions with concentrations of 16 ng/ml, 8 ng/ml, 4 ng/ml, 2 ng/ml, 1 ng/ml, and 0.5 ng/ml, respectively.

The method further comprises using quality control solutions, which are prepared by diluting a 1.0 μg/ml TCEP solution with diluent, and the concentrations of the quality control solutions are 12 ng/ml (HQC), 3 ng/ml ml (MQC), and 1 ng/ml (LQC) of TCEP quality control solutions.

Further, the diluent is a 50% methanol aqueous solution.

According to the method described in any embodiment of the first aspect of the present disclosure, the liquid chromatograph includes but is not limited to Agilent 1200 liquid chromatograph from Agilent USA, Teledyne Isco high pressure preparative liquid chromatograph, and Agilent HPLC 1260 high performance liquid chromatograph.

According to the method described in any embodiment of the first aspect of the present disclosure, the tandem mass spectrometer includes but is not limited to API 4000 tandem mass spectrometer from AB Sciex USA, Shimadzu triple quadrupole liquid chromatography mass spectrometer, and GBC inductively coupled plasma orthogonal acceleration time-of-flight mass spectrometer Optimass.

According to the method described in any embodiment of the first aspect of the present disclosure, a C18 chromatographic column is used in the liquid chromatography, including but not limited to YMC-C18, Agilent Extard-C18, and Shiseido PAK CR-18.

In any embodiment of any aspect of the present disclosure, any feature can be applied to the feature in other embodiments, as long as they do not contradict. All documents cited in the present disclosure are incorporated herein by reference in entirety, and if the meanings expressed by these documents are inconsistent with the present disclosure, the expression of the present disclosure shall prevail.

DETAILED DESCRIPTION OF EMBODIMENTS

Figure 1:
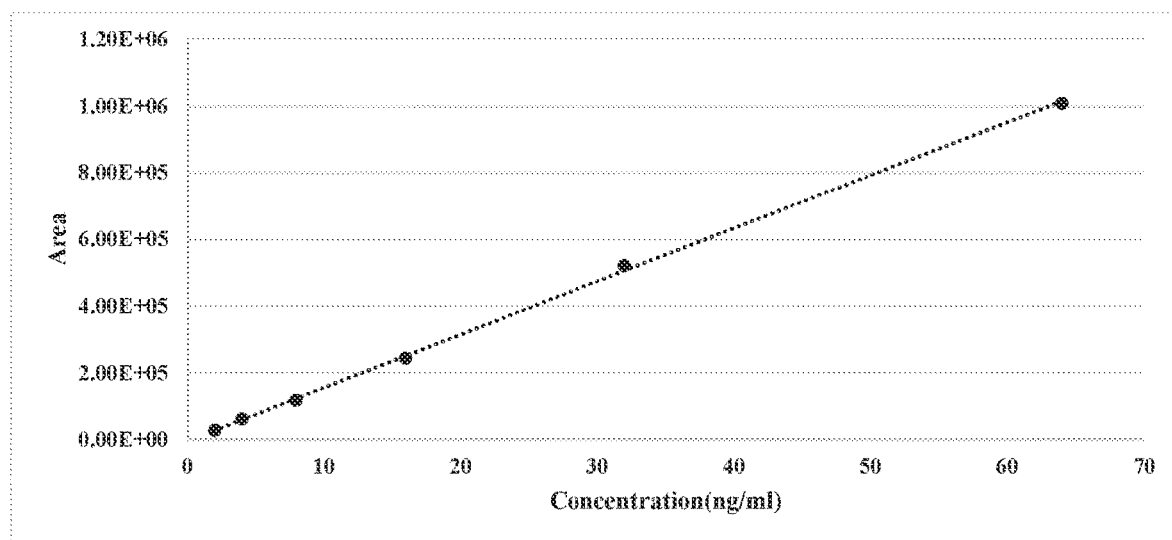
FIG. 1: Linear fitting standard curve
Figure 2:
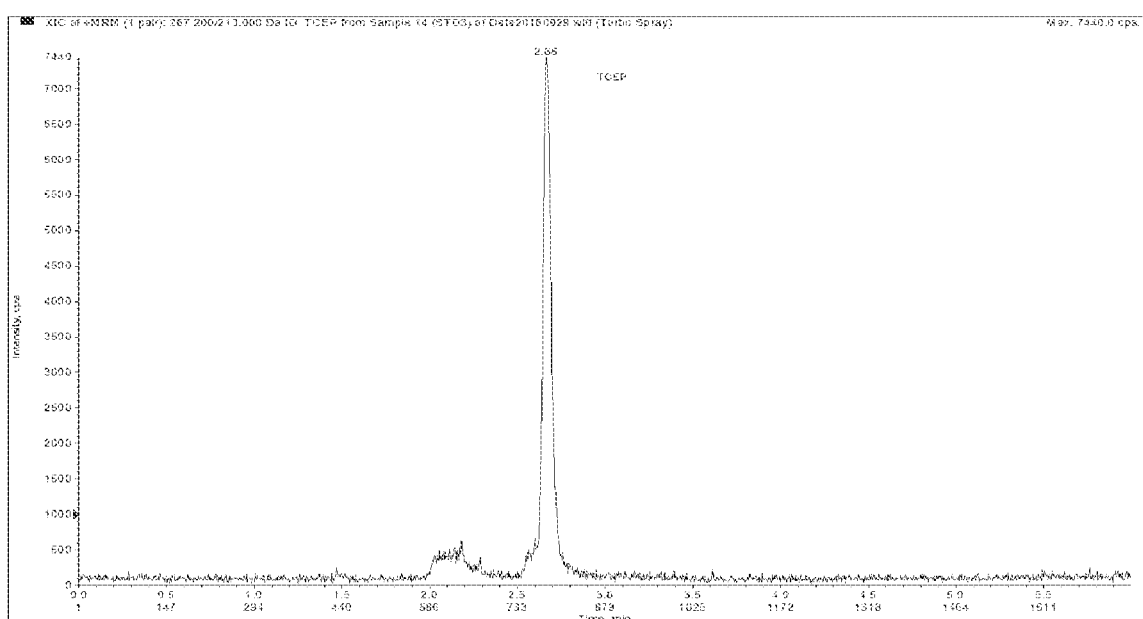
FIG. 2: Determination of TCEP content by LC-MS/MS

Example 1. Determination of TCEP Content by Liquid Chromatography-Tandem Mass Spectrometry (LC-MS/MS) Method 1) Preparation of Working Solution Preparation of TCEP working solution: 5~10 mg of TCEP·HCl reference substance was precisely weighed into an EP tube and dissolved with an appropriate amount of sample dissolving solution, and the weighed mass is expressed as m. After the TCEP concentration (TCEP concentration=250.19 m/286.65) was calculated by the molar ratio of TCEP·HCl and TCEP (1:1), it was diluted with diluent stepwise to a TCEP concentration of 1.0 μg/ml.

Preparation of DTNB working solution: 5-10 mg of DTNB was precisely weighed into an EP tube and dissolved with an appropriate amount of sample dissolving solution to a concentration of 10 mg/ml, and stepwise diluted with a diluent to 10 μg/ml.

Preparation of series solutions for standard curve: 1.0 μg/ml TCEP (recorded as A1) was diluted with diluent according to Table 1 to TCEP reference solutions with the concentrations of 16 ng/ml, 8 ng/ml, 4 ng/ml, 2 ng/ml, 1 ng/ml, and 0.5 ng/ml, respectively. 200 μl of the above solutions with different concentrations was taken, and each was added with 20 μl DTNB working solution with a concentration of 10 μg/ml. Then, it was directly tested on the machine after mixed by vortex and reacted at room temperature for 2 h in the dark.

TABLE 1

| sample name | working solution name | working solution volume (μl) | diluent volume (μl) | total volume (μl) | final concentration (ng/ml) |
|---|---|---|---|---|---|
| A2 | A1 | 50 | 450 | 500 | 100 |
| STD6 | A2 | 80 | 420 | 500 | 16 |
| STD5 | STD6 | 250 | 250 | 500 | 8 |
| STD4 | STD5 | 250 | 250 | 500 | 4 |
| STD3 | STD4 | 250 | 250 | 500 | 2 |
| STD2 | STD3 | 250 | 250 | 500 | 1 |
| STD1 | STD2 | 250 | 250 | 500 | 0.5 |

Preparation of quality control solutions: 1.0 μg/ml TCEP (recorded as A1') was diluted with diluent according to Table 2 to the TCEP quality control solutions with the concentrations of 400 ng/ml (HQC), 200 ng/ml (MQC) and 100 ng/ml (LQC), respectively. 200 μl of the above TCEP quality control solutions with different concentrations was taken, and each was added with 20 μl of DTNB working solution with a concentration of 10 μg/ml. Then it was directly tested on the machine after mixed by vortex and reacted at room temperature for 10 min in the dark.

TABLE 2

| sample name | working solution name | working solution volume (μl) | diluent volume (μl) | total volume (μl) | final TCEP concentration (ng/ml) |
|---|---|---|---|---|---|
| HQC | A1' | 400 | 600 | 1000 | 400 |
| MQC | HQC | 500 | 500 | 1000 | 200 |
| LQC | MQC | 500 | 500 | 1000 | 100 |

2) Determination by Liquid Chromatography-Tandem Mass Spectrometry:

Treatment of the samples to be tested: The mobile phase (an acetonitrile/methanol (80/20, v/v) solution comprising 0.1% formic acid) was used as the diluent, and the ADC samples were diluted to an appropriate concentrations (the TCEP content of samples is within the linear range, if it exceeds the range then the dilution factor needs to be increased/decreased for the test again). 200 μl of sample diluent was taken and added with 20 μl of DTNB solution with a concentration of 10 μg/ml. Then, it was directly tested on the machine after mixed by vortex and reacted at room temperature for 2 h in the dark.

Preparation of mobile phase A: 800 ml of water was measured and added with 800 μl of formic acid, and mixed well by ultrasonic.

Preparation of mobile phase B: 800 ml of acetonitrile and 200 ml of methanol were measured and added with 1 ml of formic acid, and mixed well by ultrasonic.

Mobile phase A and mobile phase B were used in elution according to the concentration gradient shown in Table 3.

TABLE 3

| | elution time (min) | module | event | parameter |
|---|---|---|---|---|
| elution gradient | 0.2 | Pumps | Pump B ConC | 5 |
| | 4 | Pumps | Pump B ConC | 60 |
| | 5 | Pumps | Pump B ConC | 95 |
| | 6 | Pumps | Pump B ConC | 95 |
| | 6.1 | Controller | Stop | / |

3) Data Processing and Analysis

Evaluation standard: r≥0.9800, the concentration range between the lower limit of quantification and the upper limit of quantification is the quantification range of the standard curve, and the recovery rate of the standard curve concentration points is between 85% and 115%, and the recovery rate of the concentration points of the upper limit of quantification and the lower limit of quantification is 80%-120%.

The recovery rate of the quality control is 85%-115%. At least 50% of the quality control samples of each concentration meet this range, and at least 4 quality control concentration points of the same analytical batch meet the requirements.

The specific results are as follows:

TABLE 4

Standard curve (see FIG. 1 for the specific fitting curve)

| sample name | sample type | actual concentration (ng/ml) | peak area | retention time | calculated concentration (ng/ml) | accuracy |
|---|---|---|---|---|---|---|
| STD1 | Standard | 2 | 2.85E+04 | 2.99 | 1.99 | 99.5 |
| STD2 | Standard | 4 | 6.23E+04 | 2.98 | 4.127 | 103.16 |
| STD3 | Standard | 8 | 1.18E+05 | 2.98 | 7.661 | 95.76 |
| STD4 | Standard | 16 | 2.45E+05 | 2.98 | 15.684 | 98.02 |
| STD5 | Standard | 32 | 5.21E+05 | 2.97 | 33.17 | 103.65 |
| STD6 | Standard | 64 | 1.01E+06 | 2.98 | 63.932 | 99.89 |

The standard curve obtained after linear fitting is as follows:

$y = 16058x - 416744$, $R^2 = 0.9936$, according to the results shown in FIG. 1, $R^2 > 0.99$, the fitting is excellent.

Example 2. Detection Method Results and Evaluation

1) Repeatability

1000 μl of the test samples was taken and added with 8 μl of TCEP standard (concentration of 1.0 μg/ml). 200 μl of the above solution was taken and added with 20 μl DTNB solution of 100 μg/ml, and mixed by vortex, and reacted at room temperature in the dark for 2 h. 6 copies were prepared in parallel, and the concentration results of the 6 copies were measured for evaluation. The specific results are shown in Table 5.

TABLE 5

| sample | measured concentration (ng/ml) | concentration of TCEP in sample (ng/ml) | measured concentration of standard (ng/ml) |
|---|---|---|---|
| 1 | 12.565 | 3.636 | 8.925 |
| 2 | 13.019 | 3.636 | 9.379 |
| 3 | 13.448 | 3.636 | 9.808 |
| 4 | 12.706 | 3.636 | 9.066 |
| 5 | 12.456 | 3.636 | 8.816 |
| 6 | 13.116 | 3.636 | 9.476 |
| RSD(%) | | | 4.1 |

In the field of quantitative analysis, repeatability refers to the precision of the results obtained by the same analyst within a short interval under the same operating conditions. The acceptable standard for repeatability is: the main peak concentration RSD≤15.0%, this test RSD=4.1%, so the repeatability of this method is very good.

2) Accuracy

An appropriate amount of the test product was taken, and the addition amount of TCEP of the high, medium and low concentrations and the final concentration of the standard were the LQC solution (4 ng/ml), the MQC solution (16 ng/ml) and the HQC solution (50 ng/ml) of the quality control solutions, respectively. The addition amounts of the test product and standard are shown in Table 6, and the accuracy results are shown in Table 7.

TABLE 6

| concentration (ng/ml) | addition amount of test product (μl) | concentration of TCEP standard (ng/ml) | addition amount of standard (μl) |
|---|---|---|---|
| 4 | 960 | 100 | 40 |
|  | 960 | 100 | 40 |
|  | 960 | 100 | 40 |
| 16 | 984 | 1000 | 16 |
|  | 984 | 1000 | 16 |
|  | 984 | 1000 | 16 |
| 50 | 950 | 1000 | 50 |
|  | 950 | 1000 | 50 |
|  | 950 | 1000 | 50 |

TABLE 7

| concentration of standard added (ng/ml) | measured concentration (ng/ml) | concentration in sample (ng/ml) | concentration of standard added (ng/ml) | RSD (%) | recovery rate (%) |
|---|---|---|---|---|---|
| 4 | 9.183 | 5.866 | 3.318 | 3.1 | 82.9 |
|  | 9.391 | 5.866 | 3.526 |  | 88.1 |
|  | 9.311 | 5.866 | 3.446 |  | 86.1 |
| 16 | 7.164 | 3.636 | 16.677 | 2.5 | 104.2 |
|  | 7.365 | 3.636 | 15.918 |  | 99.5 |
|  | 7.415 | 3.636 | 16.559 |  | 103.5 |
| 50 | 21.629 | 3.636 | 51.235 | 0.8 | 102.5 |
|  | 22.239 | 3.636 | 51.245 |  | 102.5 |
|  | 22.888 | 3.636 | 51.987 |  | 104.0 |

Acceptable criteria for accuracy: The recovery rate is 70.0%-130.0%, RSD≤15.0%; the recovery rate in this experiment is 82.9%~104.2%, and the RSD is 3.1%, 2.5%, and 0.8%, respectively. Therefore, according to the detection results, this method is with good accuracy, strong selectivity and high sensitivity, and is suitable for detecting the TCEP concentration in the antibody drug conjugate samples.

The spirit of the present disclosure has been described in detail above through the preferred examples of the present disclosure. Any changes, equivalent changes and modifications made to the above examples according to the essence of the present disclosure all fall within the protection scope of the present disclosure.

The invention claimed is:

1. A method for detecting TCEP content in ADC samples by liquid chromatography-tandem mass spectrometry (LC-MS/MS), wherein the detected ADC samples are derivatized by Ellman reaction, and a C18 chromatographic column is used, without need for sample pretreatment.

2. The method according to claim 1, wherein a mobile phase A used in the C18 chromatographic column is an aqueous solution comprising formic acid; preferably an aqueous solution comprising 0.1% formic acid.

3. The method according to claim 2, wherein a mobile phase B used in the C18 chromatographic column is an acetonitrile/methanol solution comprising formic acid; preferably an acetonitrile/methanol solution (80/20, v/v) comprising 0.1% formic acid.

4. The method according to claim 3, wherein concentration of the added Ellman reagent is about 5-20 μg/ml, more preferably 10.0 μg/ml.

5. The method according to claim 4, wherein the method uses TCEP to prepare standard solution.

6. The method according to claim 5, wherein the standard solution is preferably a TCEP solution of 1.0 μg/ml.

7. The method according to claim 6, wherein the preparation of the TCEP solution and the preparation of the series solutions for standard curve comprise the following steps:

1) preparation of TCEP working solution: weighing 5~10 mg of TCEP·HCl reference substance into an EP tube and dissolving with an appropriate amount of sample dissolving solution, and the weighed mass is expressed as m, calculating the TCEP concentration by a molar ratio of TCEP·HCl and TCEP of 1:1, and performing dilution stepwise to a TCEP concentration of 1.0 μg/ml;

2) preparation of series solutions for standard curve: diluting 1.0 μg/ml TCEP standard solution with diluent to the TCEP standard solutions with concentrations of 16 ng/ml, 8 ng/ml, 4 ng/ml, 2 ng/ml, 1 ng/ml, and 0.5 ng/ml, respectively.

8. The method according to claim 7, wherein the method further comprises using quality control solutions, which are prepared by diluting a 1.0 μg/ml TCEP solution with diluent, and the concentrations of the quality control solutions are 12 ng/ml, 3 ng/ml, and 1 ng/ml of TCEP quality control solutions.

9. The method according to claim 7, wherein the diluent is a 50% aqueous methanol solution.

10. The method according to claim 1, wherein the liquid chromatograph includes but is not limited to Agilent 1200 liquid chromatograph from Agilent USA, Teledyne Isco high pressure preparative liquid chromatograph, and Agilent HPLC 1260 high performance liquid chromatograph.

11. The method according to claim 1, wherein the tandem mass spectrometer includes but is not limited to API 4000 tandem mass spectrometer from AB Sciex USA, Shimadzu triple quadrupole liquid chromatography mass spectrometer, and GBC inductively coupled plasma orthogonal acceleration time-of-flight mass spectrometer Optimass.

12. The method according to claim 1, wherein the C18 chromatographic column includes but is not limited to YMC-C18, Agilent Extard-C18, and Shiseido PAK CR-18.

* * * * *